United States Patent [19]
Harper

[11] 3,793,518
[45] Feb. 19, 1974

[54] OPTICAL SCANNING SYSTEM WITH A CROSSED SCANNING PATTERN

[75] Inventor: Kennard W. Harper, Endwell, N.Y.

[73] Assignee: Ithaco Inc., Ithaca, N.Y.

[22] Filed: Mar. 17, 1972

[21] Appl. No.: 235,687

[52] U.S. Cl. ..................... 250/83.3 H, 250/83 R
[51] Int. Cl. ............................................. G01j 1/02
[58] Field of Search ..................... 250/83 R, 83.3 H

[56] References Cited
UNITED STATES PATENTS

| | | |
|---|---|---|
| 3,083,611 | 4/1963 | Ziolkowski et al. ....... 250/83.3 H X |
| 3,204,101 | 8/1965 | Brumfield et al. ............ 250/83.3 H |
| 3,612,879 | 10/1971 | Ohman ......................... 250/83.3 H |
| 3,631,248 | 12/1971 | Johnson ........................ 250/83.3 H |

Primary Examiner—Archie R. Borchelt
Attorney, Agent, or Firm—Charles C. Krawczyk

[57] ABSTRACT

An optical scanning system for horizon scanners, and the like, which provides a dual-lobe crossed scanning pattern. A detector arrangement receiving radiation from the scanner provides sufficient signals for determining the attitude of a space vehicle with reference to a planet about which the space vehicle is orbiting.

28 Claims, 15 Drawing Figures

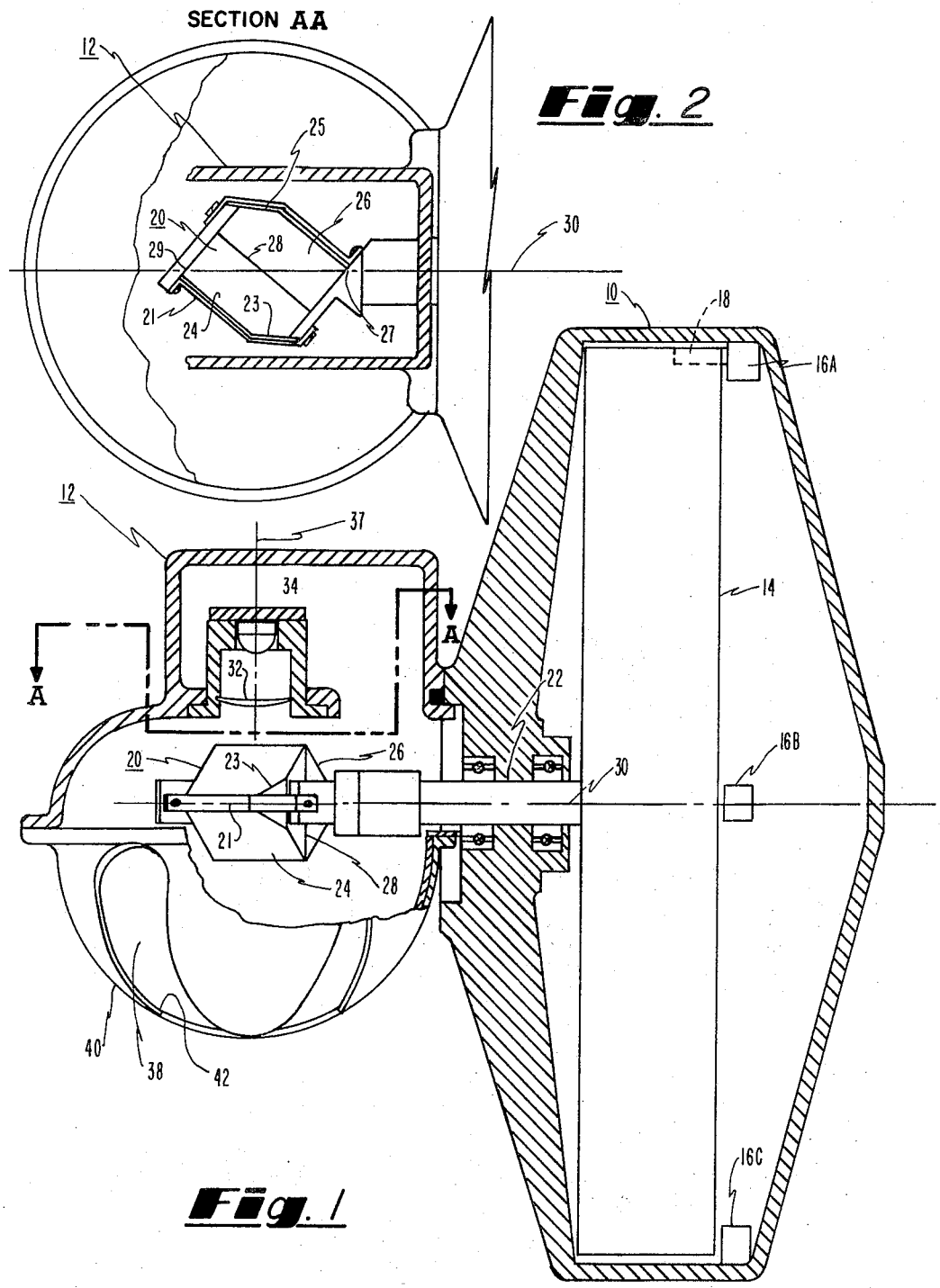

OPTICAL SCANNING SYSTEM WITH A CROSSED SCANNING PATTERN

BACKGROUND OF THE INVENTION

This invention pertains to optical scanning systems in general, and more particularly to an optical scanner for providing a dual-lobe crossed type of scanning pattern for use with horizon sensors, and the like.

When high flying aircraft, such as satellites and spacecraft, orbit a planet such as the earth, at a distance wherein the planet's gravity can not be effectively used to reference the orientation of the aircraft, other means, such as horizon sensors are required to provide attitude reference information. The reference information is used to maintain the vehicle at a constant attitude relative to the planet and therefore reduce any wobble or attitude error to an acceptable level. The horizon sensors provide information, preferably in the form of electrical signals, that correspond to the departure of the vehicle from a predetermined attitude. Attitude correction control systems, such as those employing torque wheels, gas jets, plasma jets, and the like, respond to the electrical signals to maintain the vehicle at a constant attitude. Such attitude correction control systems should be adaptable to both high and low orbits, synchronous orbits, and also highly elliptical orbits, without optical or mechanical modifications.

The attitude of a satellite is determined by its position with respect to three axes of rotation (or three angular degrees of freedom) located at right angles to each other. Two of the axes (pitch and roll) lie in a plane normal to a projected radius of the earth passing through the satellite and the third axis (yaw) coincides with such radius. The roll axis (in the direction of vehicle motion) and the pitch axis (in a direction normal to vehicle motion) lie in a plane parallel to the planet's horizon. The information pertaining to the roll and pitch axes can be used to control yaw. For example, with an attitude control system that applies correction torques to wheels located in the pitch-yar plane, yaw control can be accomplished by orbital coupling, wherein, a yaw error existing at one point of the orbit becomes a roll error a quarter of an orbit later and thus eventually all errors are sensed and corrected. Other control systems can use gyroscopes, or observation of heavenly bodies, to provide yaw orientation.

The horizon of a planet represents a line of discontinuity between the planet's atmosphere and outer space. The line of demarcation between the earth and outer space i.e., the earth's horizon, provides a marked difference in infrared radiation. Outerspace is very cold and provides very little infrared radiation, while the earth's atmosphere is much warmer and provides a substantially greater amount of infrared radiation. Although the scanning system of the present invention will be described herein as an infrared earth horizon scanner (since this is the most important and practical field of utility at the present), it is to be understood, that other types of radiation can also be employed, depending upon the planet to be orbited. Therefore, reflected visible light, or ultraviolet radiation, or any other radiation emitted or reflected by the planet, can also be used depending upon conditions surrounding the planet being orbited.

The horizon scanners presently in use include a pair of infrared scanners, each providing a conical type scan, wherein each of the scanners are oriented on opposite sides of the vehicle having the axes of the conical scan lying in the roll-yaw plane. The electrical signals from the scanners corresponding to the crossing of the earth's horizon, are translated into pitch and roll error signals for attitude correction. In addition, the electrical signals can be processed to provide an indication of altitude. A scanning arrangement of this type is disclosed in a U.S. Pat. No. 3,020,407, issued to M.M. Merlen and entitled "Horizon Sensor." Although horizon sensors of this type have been successfully used in the past, such horizon sensors require duplication of parts resulting in added weight, power consumption and multiplication of moving parts, thereby effecting the overall statistical life expectancy of the vehicle.

A single scanning arrangement has been developed in the prior art that includes two prisms rotated in opposite directions at a predetermined speed ratio. A scanning arrangement of this type is disclosed in a U.S. Pat. No. 3,083,611, issued to Adrian J. Ziolkowski et al and entitled "Multi-Lobe Scan Horizon Sensor." The counter-rotating prisms produce a multi-lobe crossed scanning pattern having at least three lobes. With this arrangement, the number of lobes to be used in the scanning pattern is determined by the speed of the scan relative to the response of the detection devices, the desirability for an even number of lobes, the width of the lobes, etc. In the particular embodiment disclosed, a four lobe scanning pattern was preferred.

Although, this multi-lobe scanning arrangement did eliminate some of the problems of duplication of parts, the arrangement still requires two moving optical elements, large bearings, and corresponding gear drive units. In addition, the arrangement also requires, preferably, at least a four lobe scan resulting in the detection of eight horizon crossings further resulting in added complications in signal processing. Furthermore, if it is desired to reduce the width of the lobes of the scan pattern, the relative difference between the speeds at which the prisms are rotated is increased, possibly resulting in a condition wherein the speed of the scan will be too fast for the detection devices, or else possibly creating undesirably long time constants in the control system if the scan rates are reduced to stay within the response time of the detection devices.

The optical scanners of this type require two sets of moving parts, one for each prism. Due to the low pressure experienced by vehicles orbiting in outer space, it is desirable to maintain such moving parts in pressurized units to minimize lubrication problems. In any event, it is highly desirable to minimize the number of moving parts, their mass, and the rate at which the parts move, so that lubrication requirements can be minimized.

It is therefore an object of this invention to provide a new and improved optical scanning system.

It is also an object of this invention to provide a new and improved optical scanner system for horizon sensors, and the like, requiring only one movable optical unit.

It is a still further object of this invention to provide a new improved optical scanning system for horizon sensors that provides a dual-lobe crossed scanning pattern.

It is a still further object of this invention to provide a new and improved optical scanning system providing a dual-lobe crossed scan pattern wherein the width of the lobe can be changed without increasing the speed of the scan, or requiring additional lobes in the scanning pattern.

It is another object of this invention to provide a new and improved optical scanning system for horizon sensors that reduces the weight and power requirements and reduces the number of moving parts thereby increasing the systems reliability.

It is still a further object of this invention to provide a new and improved single scanning system for horizon sensors that is adaptible to high and low orbits, synchronous orbits, and elliptical orbits without modification.

It is another object of this invention to provide an optical scanning arrangement for transmitting a beam of radiation in a dual-lobe crossed scanning pattern that only requires a single moving optical element.

BRIEF DESCRIPTION OF THE INVENTION

The scanning system of the invention provides a dual-lobe crossed type of scanning pattern. When used with horizon sensors, radiation is received by the scanning system from the planet which is being orbited and is directed toward detection means for providing electrical signals corresponding to the attitude of the space vehicle relative to the planet's horizon. In an alternative embodiment, radiation from a source, such as a laser, is directed at the scanner system, wherein the scanning system projects a radiation beam along the dual-lobe crossed scanning pattern.

In accordance with the invention the scanner includes at least one optical element, such as a prism, having a relfective surface, mounted for rotation on an axis which is at an angle transverse to the reflecting surface and wherein the center line of the optics of the detector, or radiation source, is located at an angle transverse to the axis of rotation, and usually normal thereto. In the preferred embodiment, a double dove prism is used having two right angle prisms positioned with their reflecting surfaces (hypotenae) abutting each other.

A further feature of the invention includes the use of a three flake detector for providing an automatic sun radiation rejection function. One of the three flakes functions as a common flake. The common flake is used with one of the other flakes during one half the dual-lobe crossed scanning pattern, and is used with the other flake during the other half of the scanning pattern.

Control circuit means is provided, responsive to signals generated by the detector means, for producing control signals for correcting the attitude of the space vehicle.

BRIEF DESCRIPTION OF THE FIGURES

FIG. 1 illustrates a vertical sectional view through a horizon sensor including the optical scanning system of the invention.

FIG. 2 illustrates a top sectional view of the optical scanner portion of the horizon sensor of FIG. 1 taken along the lines A—A.

DESCRIPTION OF THE PREFERRED EMBODIMENT

Figure 3:
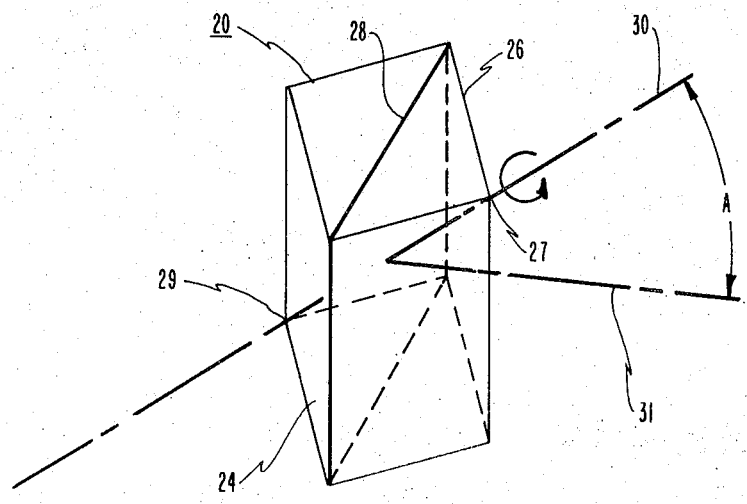
FIG. 3 illustrates an isometric view of the prism of FIGS. 1 and 2 with the axis of rotation intersecting the prism reflective surfaces.

The horizon sensor of FIG. 1 includes a motor drive unit 10 and an optical scanning unit 12. The drive unit 10 includes a reaction wheel arrangement including a variable speed momentum wheel powered by a two phase induction motor (not shown). The motor is of a constant torque design, that is, the available torque is substantially independant of operating speed. The rotor 14 is outside the stator (not shown) to maximize momentum. The angular position of the rotor 14 is detected by (four) magnetic detectors 16A–16D mounted on the base 11 and located at 90 degree intervals adjacent to the circumference of the reaction wheel rotor 14. A permanent magnet 18 is fastened to rotor 14, which in turn induces a reference signal in the magnetic detectors 16A–16D as the magnet passes the individual detectors.

The optical scanning unit 12 includes, in the preferred embodiment, a double dove prism 20 suitably fastened to a shaft 22 by a strap mechanism 21 so that the prism 20 is rotated by the motor driven unit 10. The double dove prism 20 consists of two right angle Harting-Dove type prisms 24 and 26, each having a silvered reflecting surface 28. The two prisms 24 and 26 are cemented together with their reflecting surfaces 28 (hypotenae) abutting and are secured to the shaft 22 by the strap mechanism 21, wherein the double dove prism 20 takes the shape of a rectangular shaped cube. Two opposite corners 23 and 25 of the cube are cut away or beveled to simplify the securing thereof by the strap mechanism 21. As will be shown in a later portion of the specification, only a portion of the scanning pattern of the double dove prism 20 is employed for horizon sensing and therefore the strap mechanism 21 will not interfere with the scanning operation. In the particular embodiment of the invention as illustrated in FIGS. 1 and 2, the double dove prism 20 is mounted for rotation about an axis 30 that passes through opposite corners 27 and 29 of the cube and transverse a plane including the reflecting surfaces 28. In the embodiment illustrated in FIGS. 1, 2 and 3, the plane including the reflecting surfaces 28 is displaced relative to the axis of rotation 30 so that an angle A on the order of 45 degrees is formed between the axis 30 and a line 31 normal to the plane. Hence, as the prism 20 is rotated about the axis 30, the reflecting surfaces 28 provides a wobbling motion relative to the axis.

The double dove prism 20 receives parallel or collimated radiation and transmits the same to a focusing lens 32. The focusing lens 32, in turn, focuses the beam of radiation upon a detector 34, illustrated in this particular embodiment as a hyper-immersed hemisphere bolometer. The axis 37 of the lens 32 intersects the double dove prism 20 in the center of the plane 28 (prism hypotenuse) and also intersects, and is normal to, the axis of rotation 30. Hence, as the double dove prism 20 is rotated about the axis 30, each of the reflecting surfaces 28 of the prisms 24 and 26 face in the general direction of the lens 32 during opposite 180 degree portions of the rotation of the shaft 22.

Figure 6:
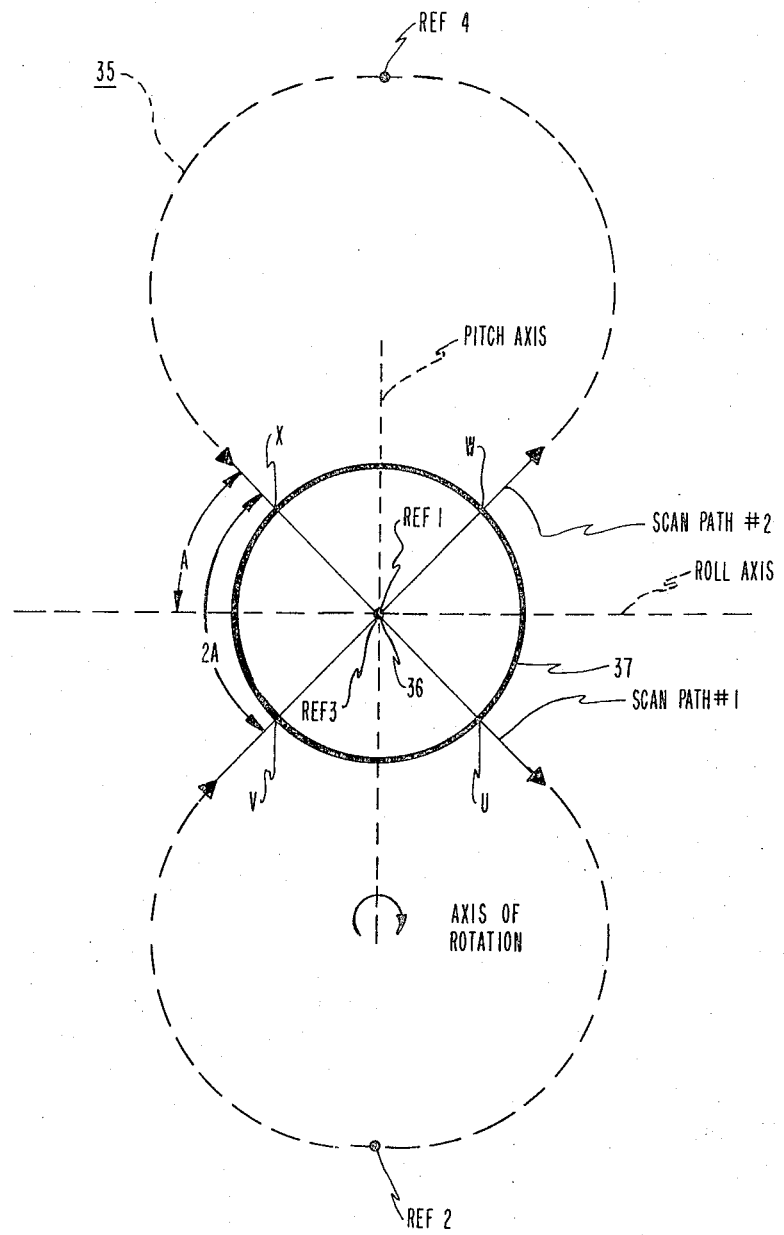
FIG. 6 illustrates the dual-lobe crossed scanning pattern of the optical scanning system of the invention in a position corresponding to correct vehicle attitude.

The double dove prism 20, as it is rotated, provides a dual-lobe crossed, or "figure eight," type scanning pattern 35 as illustrated in FIG. 6. It is to be understood, that the scanning pattern 35, as illustrated in FIG. 6, shows a general representation of the dual-lobe crossed shape pattern and is not a scale representation. The portion of the scanning pattern 35 near the crossover point 36 illustrated by the solid lines designates a linear or nearly linear postion of the scan trace that can be used for sensing of the earth's horizon 37. The portion of the scanning unit 12 (FIG. 1) facing the earth is covered with a radiation transmitting dome 38. Since only the portion of the scanning pattern near the crossover 36 is used for horizon sensing, the dome 38 can be covered with a metallic shell 40 having an "X" type cut-away 42 and thereby provide added supporting strength to the dome 38. The "X" type cut-away 42 provides a radiation transmitting path for the linear portion of the scanning pattern.

Figure 4A:
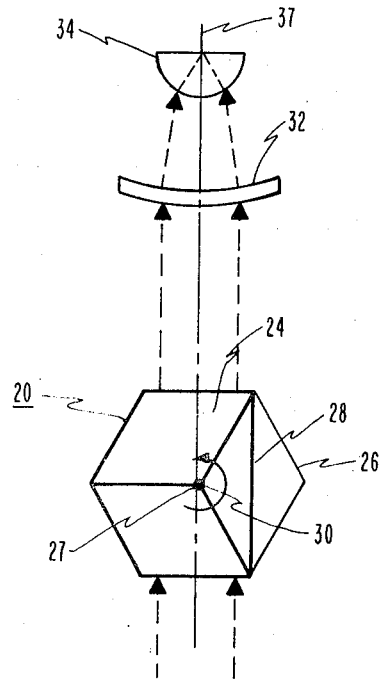
FIGS. 4A and 4B illustrate an optical schematic diagram of the scanning system of the invention, as viewed along the axis of rotation, and as viewed normal to the axis of rotation, respectively, for a zero degree scan position.
Figure 5A:
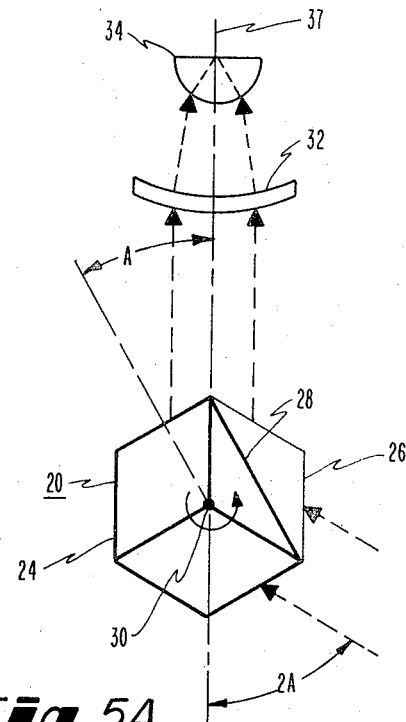
FIGS. 5A and 5B illustrates an optical schematic diagram of the scanning system of the invention, as viewed along the axis of rotation, and as viewed normal to the axis of rotation, respectively, for a scan position in the order of 45 degrees.
Figure 4B:
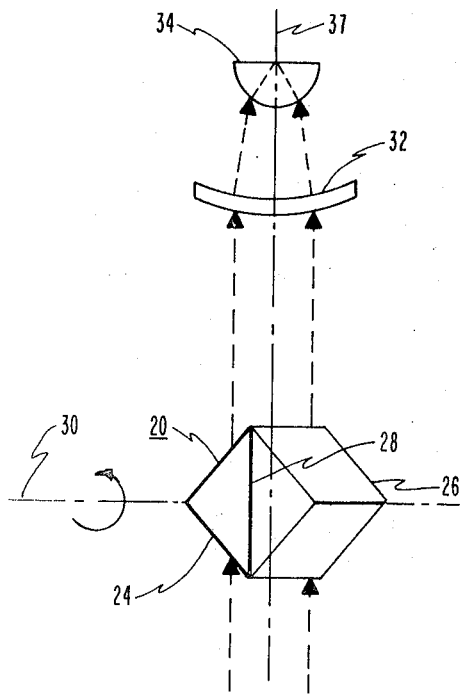
Figure 5B:
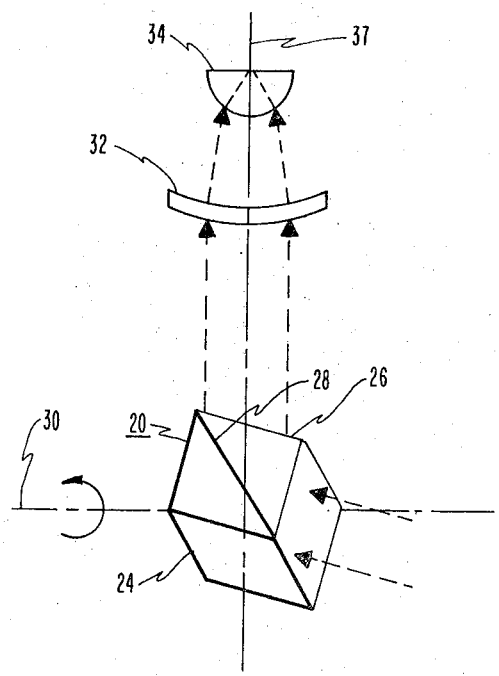

FIGS. 4A and 4B illustrate the position of the double dove prism 20 in a zero degree rotational position which corresponds to the crossover point 36. The radiation received from the crossover point 36 is transmitted along the centerline 37 of the lens 32 to the detector 34 (as illustrated by the dashed lines). The rotation of the prism 20 about the axis 30 produces a scan coverage at twice the shaft rotation. This is illustrated in FIGS. 5A and 5B, wherein the prism 20 is rotated to an angle of A degrees relative to the center line 37 to produce a scan angle of 2A degrees. Since the rotation of the double dove prism 20 produces twice the scan angle, a single rotation of the double dove prism 20 around the axis 30 produces the dual-lobe crossed scanning pattern 35 of FIG. 6.

It can be assumed that the reference point 1 (detected by magnetic sensor 16A) of the scanning pattern 35 corresponds to the zero degree position of the double dove prism 20 as illustrated in FIGS. 4A and 4B. As the double dove prism 20 is rotated in the direction as designated, the scanning system scans in the direction of scan path No. 1. When the double dove prism 20 is rotated an angle of 90 degress the reference point 2 is reached and detected by the magnetic sensor 16B. Further rotation of the prism 20 in the same direction causes the scan pattern to arc back towards the crossover point 36 along scan path No. 2. When the double dove prism 20 is rotated an angle of 180 degrees, the crossover point 36 is reached a second time and the reference point 3 is detected by the magnetic detector 16C. As the double dove prism 20 is further rotated, the scanning pattern continues to follow in the same direction along the scan path No. 2. When the rotation angle of 270 degrees is reached, the reference point 4 is detected by the magnetic sensor 16D. Still further rotation causes the scanning pattern to curve back towards the crossover point 36 along the scan path No. 1. When a full 360 degree rotation angle is reached, the reference point 1 is detected a second time by the magnetic sensor 16A. Therefore, it can be seen that a complete rotation of the double dove prism 20 about the rotational axis 30 produces the dual-lobe crossed scanning pattern 35 having a linear or substantially linear portion designated by the solid dark lines. This nearly linear portion is used for horizon sensing. Since only a portion of the scanning pattern is used, the "X" shaped cut away 42 in the metallic shell 40 (FIG. 1) need only be large enough to expose the selected crossed portion of the scan pattern. In addition, the strapping mechanism 21 does not block the linear portion of the scanning pattern.

With the plane of the reflecting surfaces 28 tilted to define an angle A between the line 31 normal to the plane and the axis of rotation 30, set at 45 degrees (as illustrated in the particular embodiment of FIGS. 1, 2 and 3) the angle 2A between the scan path No. 1 and No. 2 is 90 degrees and scanning paths No. 1 and No. 2 cross at right angles. It should be noted that the shape of the scanning pattern 35 can be changed by merely changing the angle A. For example, if a narrower lobe pattern is desired, the angle A need merely be increased. On the other hand, if the lobe pattern is to be increased, the angle A is decreased. The wider lobe pattern may be desirable for low altitude satellites.

The scan pattern 35 crosses the earth's horizon four times (as designated by points U, V, W and X) for each rotation of the double dove prism 20. In response to the scanning pattern, the amplitude of the output signals generated by the detector 34 switched between two levels, that is, a low level signal while scanning outer space and a much higher level signal while scanning the earth's atmosphere. The occurance and duration of signal pulses generated by the detector 34 as the scan pattern traverses the earth during scan path No. 1 (between points X and U) and generated during scan path No. 2 (between points V and W), when compared with the detection of the reference points 1-4 by the magnetic sensors 16A-16D, provides an indication of the attitude of the vehicle relative to the earth's horizon.

Figure 7:
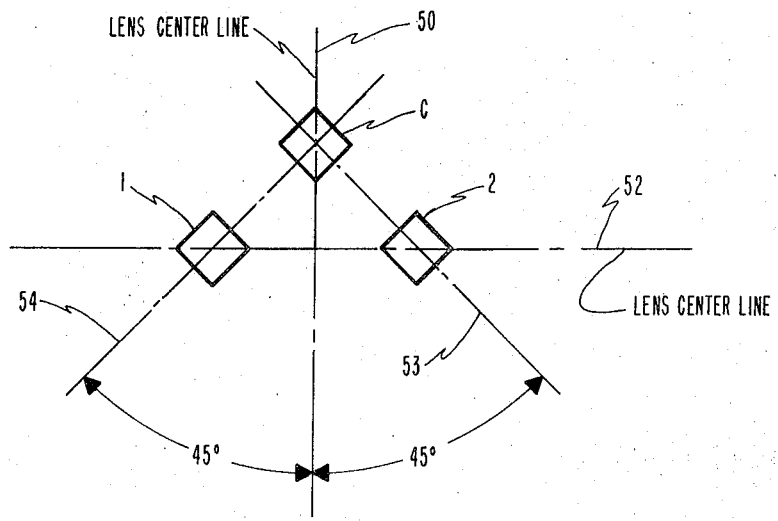
FIG. 7 illustrates a three flake detector arrangement for use with the optical scanning system of the invention, for sun radiation rejection.
Figure 8:
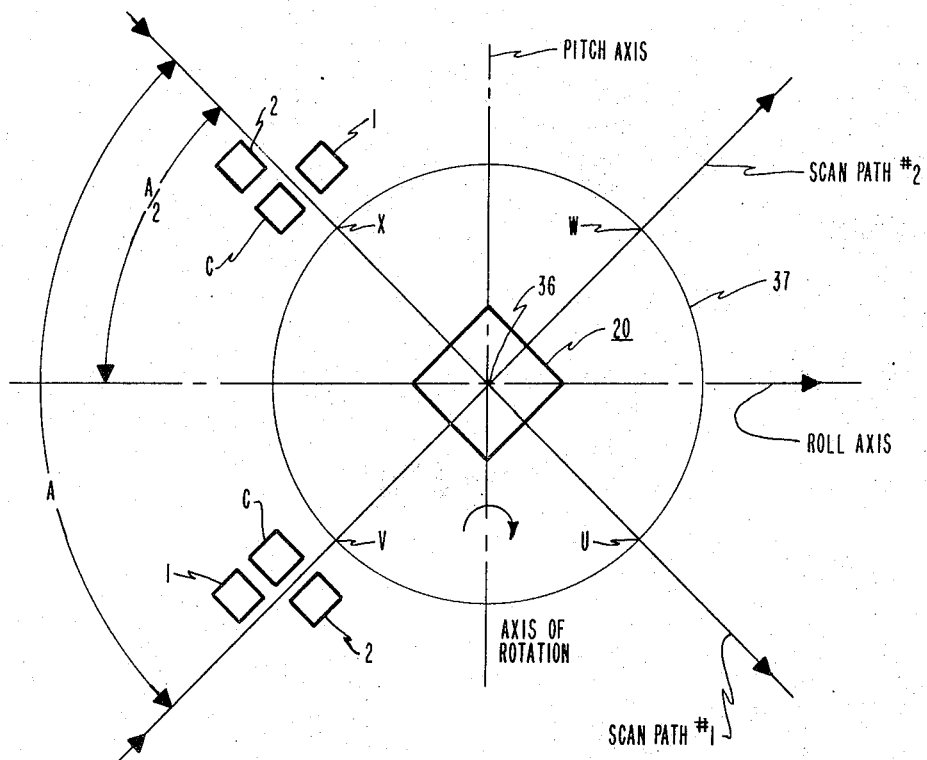
FIG. 8 illustrates the position of the optical scanner of the invention relative to the roll and pitch axis of the vehicle and in a position corresponding to a correct attitude position relative to the earth, designating the directions of the scan paths and the sequence at which the three flake detectors of FIG. 6 receive radiation signals from the scanner depending upon the particular path scan in the scan pattern.
Figure 9:
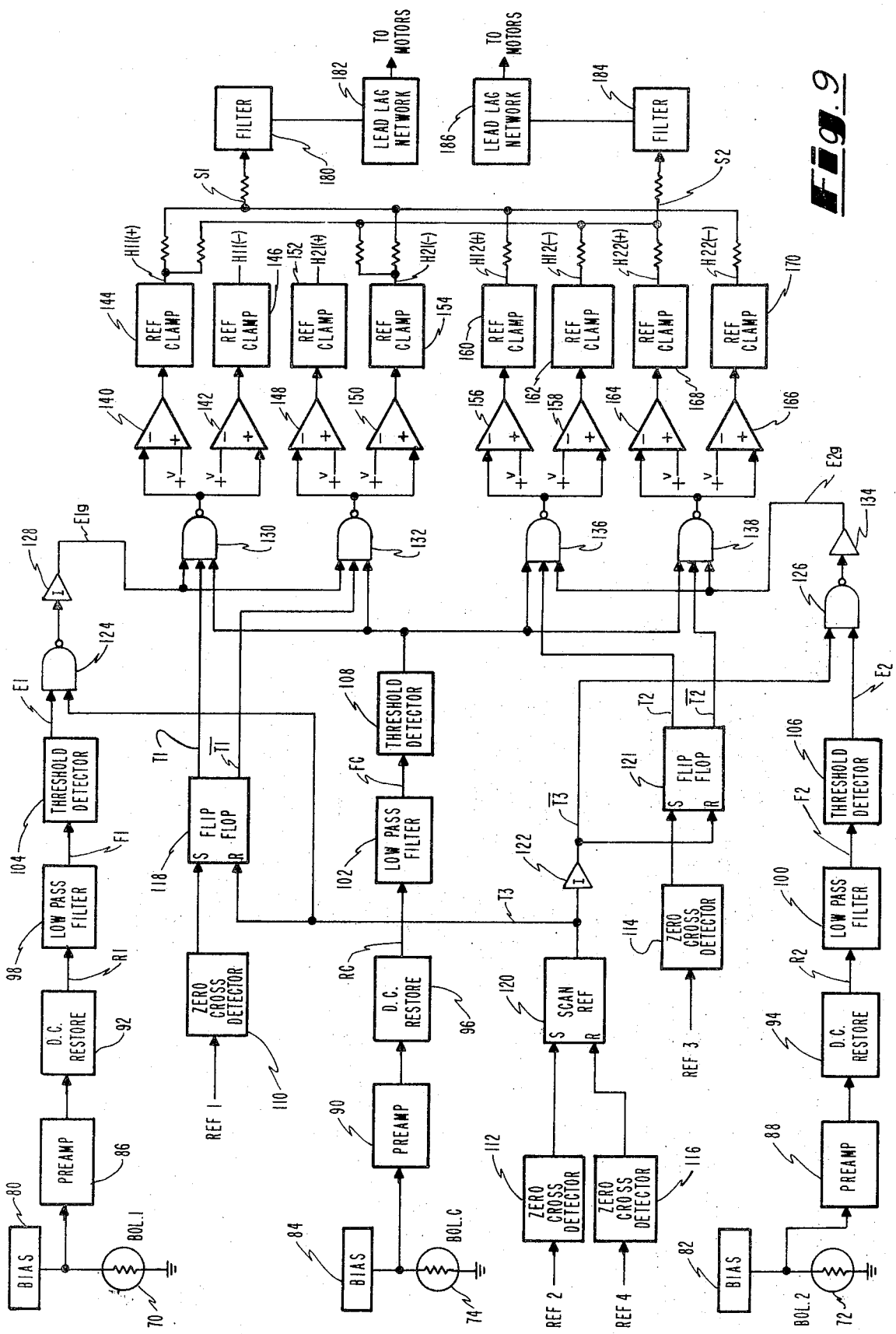
FIG. 9 illustrates a schematic diagram of a control circuit responsive to signals generated by the three flake detector arrangement of FIG. 7 for producing control signals for controlling the attitude of the space vehicle.

FIG. 7 illustrates a three flake infrared detector arrangement including the flakes 1, 2 and C. The flake C is mounted within the bolometer with its midpoint positioned on a first or vertical center line 50 of the bolometer 34 and at a midpoint between the flakes 1 and 2. The flakes 1 and 2 are located with their centers located on a second or horizontal center line 52 of the bolometer 34. The lines 53 and 54 scribed between the center point of the flake C and the center points of flake 1 and 2 define an angle 90 degrees there-between, and an angle of 45 degrees between the lines 53 and 54 and the center line 50. The combination of the three flake detector arrangement along with the control system of FIG. 9 provides for sun radiation rejection. The detector arrangement is such, taht at least two flakes are required to be simultaneously irradiated at any one time if the signals from the flakes are to be accepted. The flake C is irradiated simultaneously with either flake 1 or with flake 2. This arrangement is illustrated by the portion of the scanning pattern illustrated in FIG. 8. As the scanning pattern approached the cross-over point 36 scan along path No. 1, the flake C and flake 1 simultaneously receive radiation from the earth's horizon. When the double dove prism is rotated an additional 180 degrees to follow scan path No. 2, the image of the earth transmitted to the detector 34 is reversed so that the flakes C and 2 simultaneously receive radiation from the earth's horizon. In the case of radiation from the sun, the optical arrangement provides that only one flake will be irradiated at any one time and therefore any signals generated by any one of the flakes C, and 1 or 2, is electrically rejected by the control circuit of FIG. 9 in a manner as hereinafter explained.

Electrical signals generated by the flakes 1, 2 and C are converted by the control system of FIG. 9 into signals corresponding to pitch and roll errors. Each of the detector circuits 70, 72 and 74 corresponding to flakes 1, 2 and C respectively, are biased for proper operation by the bias circuits 80–84, respectively. The output signals from the detectors 70, 72 and 74 are initially processed by three sets of identical circuitry, each including a preamplifier (86–90), a DC restorer (92–96), a low pass filter (98–102) and a threshold detector circuit (104–108).

The signals from the magnetic detectors 16A–16D are applied to separate ones of the zero crossover detector circuits 110–116, respectively. The arrangement is such, that at a rotational angle of the prism 20 of zero degrees, a signal pulse is applied to the cross-over detector 110, at a rotational angle of 90 degrees a signal pulse is applied to the crossover detector circuit 112, at a rotational angle of 180 degrees a signal pulse is applied to the cross-over detector 114, and at the rotational angle of 270 degrees a signal pulse is applied to the crossover detector circuit 116. The output circuit of the zero crossover detector 110 is connected to the "set" terminal of a flip-flop 118, the output circuit of the zero crossover detector 112 is connected to the "set" terminal of the flip-flop 120, the output circuit of the zero crossover detector circuit 116 is connected to the "reset" terminal of the flip-flop 120, and the output circuit of the zero crossover detector 114 is connected to the "set" terminal of the flip-flop 121. The T3 output circuit from the flip-flop 120 is connected to the "reset" input of the flip-flop 118 and also through an inverter circuit 122 to the "reset" terminal of the flip-flop 120. Hence, it can be seen that the flip-flop 118 is "set" at the zero degree rotational angle (reference point 1) and is reset at a 90 degree rotational angle (reference point 2). In a similar manner the flip-flop 121 is "set" at the 180 degree rotational angle (reference point 3) and is "reset" at the 270 degree rotational angle (reference point 3).

The output signals from the threshold detector 104 are applied to one input circuit of an AND gate 124, while the other input circuit is connected to the output circuit T3 of the flip-flop 120. The AND gate 124 is only enabled during the portion of the scan between the rotational angle of 90 degrees (reference point 2) and 270 degrees (reference point 4). Output signals from the threshold detector circuit 106 are applied to one input of an AND gate 126, while the other input circuit is connected to the inverter 122. The AND gate 126 is enabled only during the portion of the scan between the rotation angle of 270 degrees (reference point 4) and 90 degrees (reference point 2).

Output signals from the AND gate 124 are applied through an inverter circuit 128 to an input circuit of the AND gates 130 and 132. In a similar manner output signals from the AND gate 126 are applied through inverter 134 to an input circuit of the AND gates 136 and 138. A second input circuit of each of the AND gates 130–138 is connected to the output circuit of the flake C threshold detector 108. Hence the AND gates 130–138 can not be enabled unless the detector 74 (flake C) is irradiated, thereby rejecting signals from the threshold circuits 104 and 106 and providing sun rejection. The third output circuit of the AND gate 130 is connected to the output T1 of the flip-flop 118, while the third input circuit to the gate 132 is connected to T̄1 output circuit. In a similar manner, the third input of the AND gate 136 is connected to the T2 output circuit of the flip-flop 121, while the T̄2 output is connected to an input circuit of the AND gate 138.

The output circuit of the AND gate 130 is connected through the differential amplifiers 140 and 142 to the reference clamp circuits 144 and 146 to produce the signals H11(+) and H11(−). In a similar manner, the output circuit of the AND gate 132 is connected through the differential amplifier circuits 148 and 150 to the reference clamp circuits 152 and 154 to produce the output signals H21(+) and H21(−). The output circuit of the AND gate 136 is connected through the differential amplifiers 156 and 158 to the reference clamp circuits 160 and 162 to produce signals H12(+) and H12(−), while the output circuit of the AND gate 138 is connected through the differential amplifiers 164 and 166 to the reference clamp circuits 168 and 170 to produce the output H22(+) and H22(−). The symbol (+) indicates that a positive signal of a preset amplitude is generated, while the symbol (−) indicates that a negative signal of preset amplitude is generated. The output signals H11(+), H21(−), H12(+) and H22(−) are combined to produce a signal S1. The output signals H11(+), H21(−), H12(−) and H22(+) are combined to produce an output signal S2. The signal S1 is applied through a filter circuit 180 and a lead-lag network 182 to produce the pitch error signals. The signal S2 is applied through a filter circuit 184 and the lead-lag network 186 to produce the roll error signals.

Figure 10:
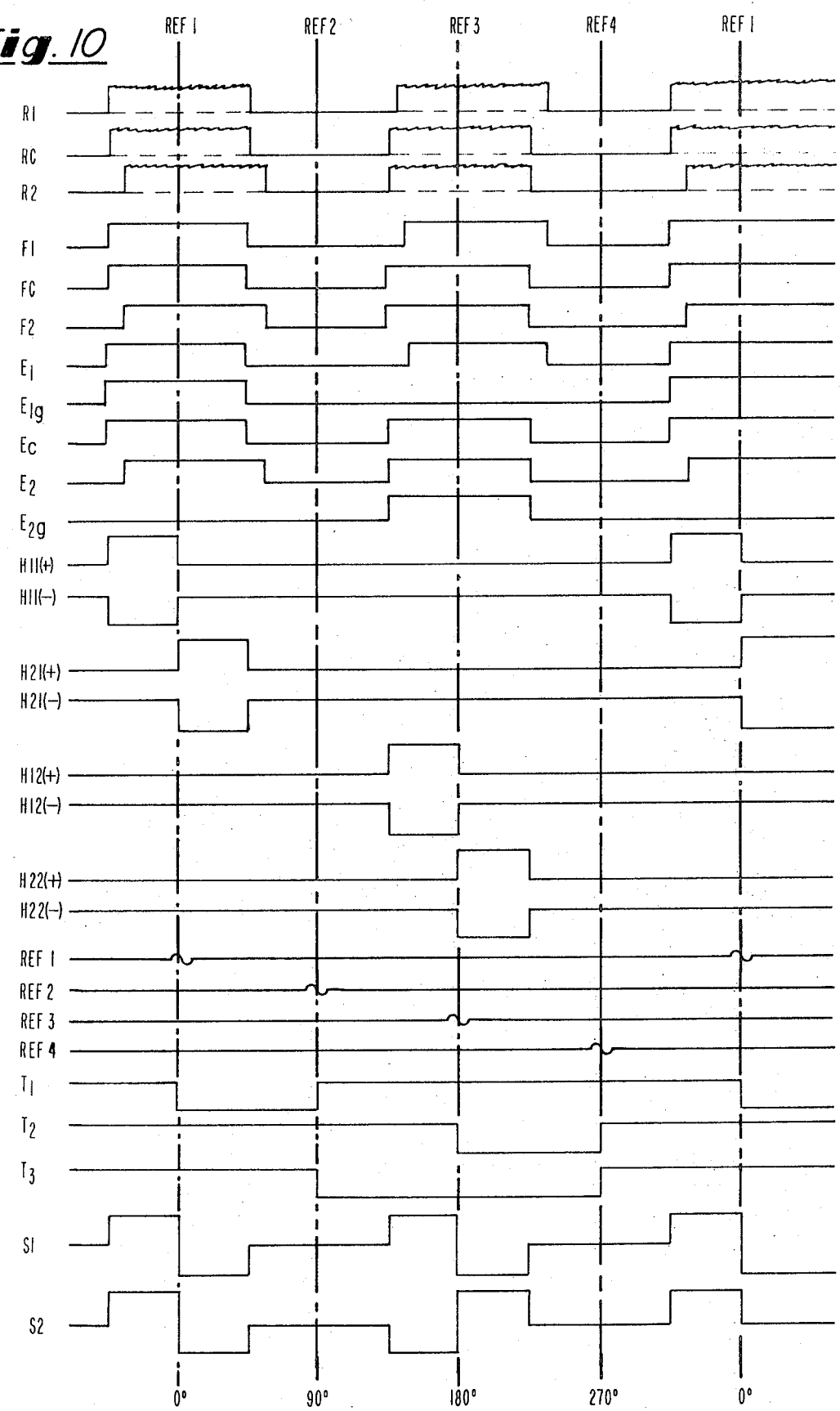
FIG. 10 illustrates a series of waveforms disclosing the signals processed by the control circuit of FIG. 9 with a zero attitude error.
Figure 11:
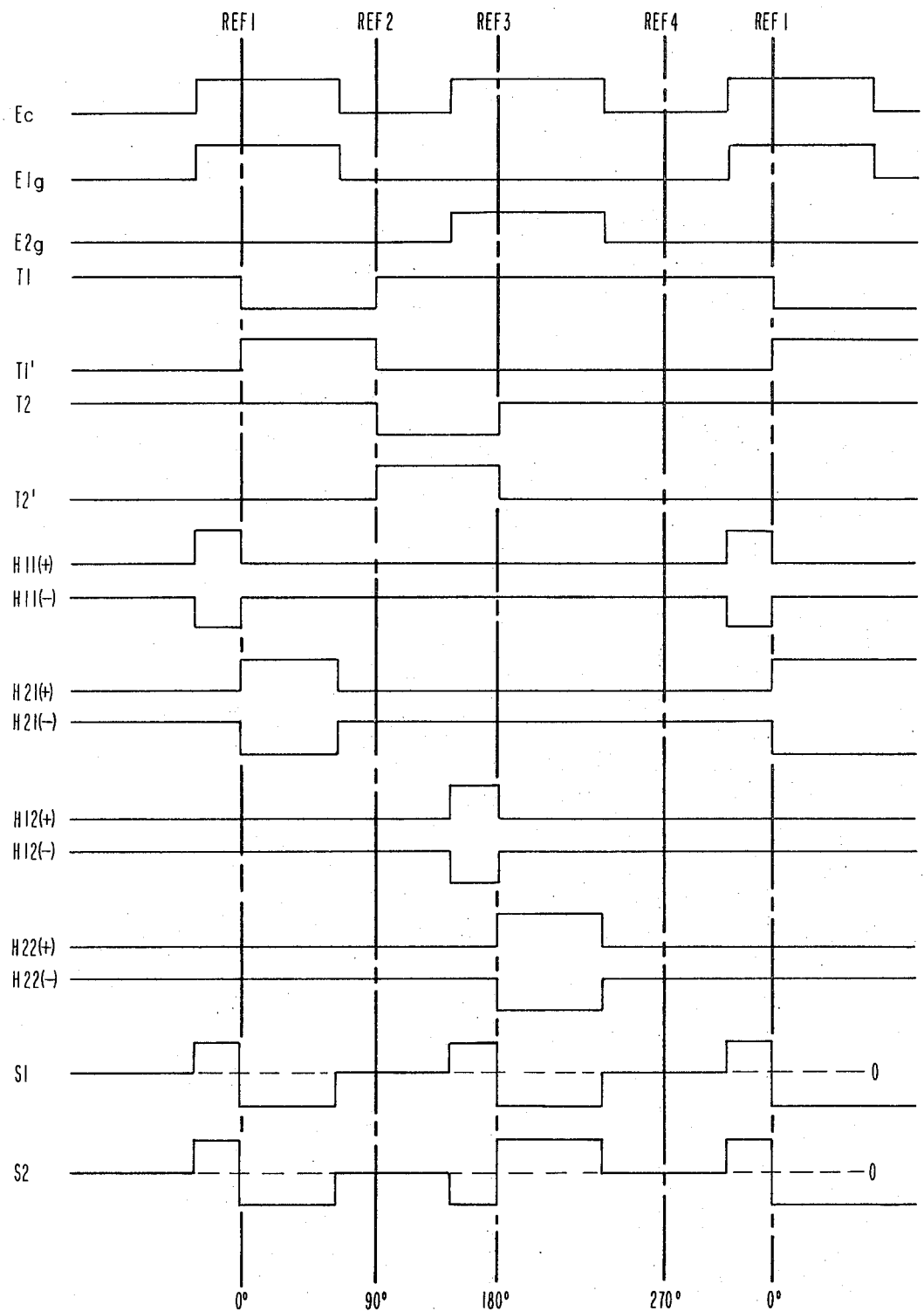
FIG. 11 illustrates a plot of the electrical waveforms of the control circuit of FIG. 9 wherein a pitch error is detected.
Figure 12:
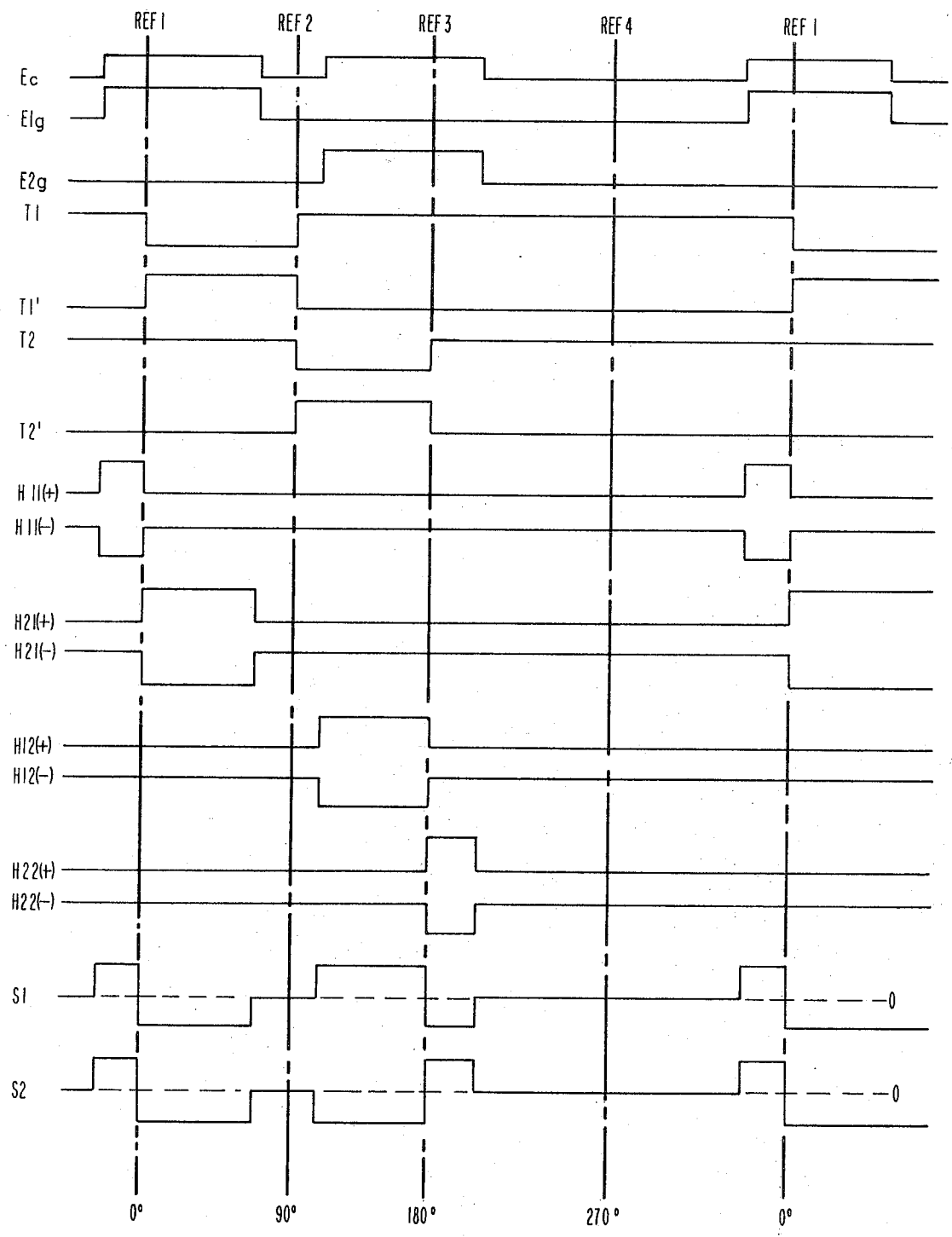
FIG. 12 illustrates a plot of the electrical waveforms of the control circuit of FIG. 9 wherein a roll error is detected.

The operation of the control system of FIG. 9 will now be explained with reference to the electrical waveforms of FIGS. 10–12. It is to be understood, that the waveforms are not drawn to scale but are exagerated, since the primary purpose of FIGS. 10–12 is to aid in the explanation of the timing sequence of reference pulses 1–4 relative to the occurrance of the horizon sensing pulses from the detectors and the corresponding enabling of the gating circuit to produce the various pitch and roll error signals. The electrical waveforms are designated with reference letters along the left hand side of the Figures, which provide a cross reference to corresponding signals from the circuits of FIG. 9.

As previously mentioned, the timing for the control system is provided by the reference pulses 1–4 induced in the magnetic sensors 16A–16D as the double dove prism 20 is rotated. The occurance of the reference pulses (REF1–REF4) are denoted by a sinsusoidal pulse with a zero amplitude crossover that produces the timing pulse. The waveforms are referenced to the timing pulses by the verticle lines designated at the top by REF1–REF4 and at the bottom by the angle of rotation.

FIG. 10 illustrates the electrical waveforms for a proper attitude of the space vehicle relative to the earth, i.e. zero roll error and zero pitch error. During scan path No. 1 flakes 1 and C cross the earth's horizon simultaneously to produce the signals R1 and RC. Shortly thereafter, the flake 2 crosses the earth's horizon to produce the signal R2. During the subsequent scan path No. 2, the flakes 2 and C cross the earth's horizon simultaneously, while flake 1 crosses shortly thereafter. Hence the signals R1, R2 and RC occurring during the period including the reference point REF1 (0°), are scan path No. 1 signals while the signals occurring during reference point REF3 (180°) are scan path NO. 2 signals. The signals R1, R2 and RC are filtered by the filter circuits 98, 100 and 102, respectively, to remove any noise and produce the signals F1, F2 and FC. The signals F1, F2 and FC are processed by the threshold detectors 104–108, respectively, to produce signals E1, E2 and EC. The enabling sequence of AND gates 124, 126, 130, 132, 136 and 138 is under the control of the output signals from the flip-flops 118, 120 and 121, as designated by the signals T1, T2 and T3, respectively. The AND gate 124 is enabled by the signal T3 to pass the signal E1 to produce the signal E1g. The AND gate 126 is enabled by the signal $\overline{T3}$ (the opposite of signal T3) to pass the signal E2 to produce a signal E2g. The signals H11(+) and H11(−) are generated in the response to the simultaneous presence of signals T1, E1g and EC. The signals H21(+) and H21(−) are generated in response to the simultaneous presence of the signals $\overline{T1}$, E1g and EC. The signals H12(−) are generated in response to the simultaneous presence of the signals T2, E2g and EC. The signals H22(+) and H22(−) are generated in response to the simultaneous presence of the signals $\overline{T2}$, E2g and EC. With zero attitude error, the timing of these signals is such that the durations of the signals designated by the letter H are essentially equal, and when they are combined, the signals average out to produce zero pitch error S1, and zero roll error S2.

FIG. 11 illustrates the waveforms of the signals of the control system of FIG. 9 when a pitch error is present. The relation between the signals E1, E2 and EC from the flakes 1, 2 and 3, along with the timing reference pulses REF1–REF4, set the flip-flops 118–121 so that the signals T1, $\overline{T1}$, T2, $\overline{T2}$, T3, $\overline{T3}$ and EC control the enabling of the AND gates 124, 126, 130, 132, 136 and 138 in such a manner that the H signals are of unequal duration. Note that in the case of pitch error, the signals H11(+), H11(−), H12(+) and H12(−) are substantially shorter in duration than the signals H12(+), H12(−), H22(+) and H22(−). When the H signals are combined, the S2 signal averages out to produce a zero roll error. However the S1 signal, when averaged out, produces a negative going error indicating the magnitude and the direction of the pitch error.

FIG. 12 illustrates the waveforms for the control system of FIG. 9 in the case of a roll error and zero pitch error. As in the case of pitch error, the signals T1, $\overline{T1}$, T2, $\overline{T2}$, T3 and $\overline{T3}$ and EC control the timing of the AND gates 124, 126, 130, 132, 136 and 138 so that different durations of H signals are generated. In the case of roll error, the signals H11(+), H11(−), H22(+), H22(−) are substantially shorter than the signals H12(+), H12(−), H21(+), and H21(−). When the H signals are combined, the S1 signal averages to zero indicating a zero pitch error. When the S2 signal is averaged out, a negative going error signal is produced indicating the magnitude and the direction of the roll error.

Hence, it can be seen that the control system of FIG. 9 is responsive to the signal pulses generated by the flakes 1, 2 and C and the reference pulses REF1–REF4 to produce signals S1 and S2 indicating the magnitude and direction of any pitch, or roll error, or both. As previously mentioned, the flake C must be irradicated with either of the flakes 1 or 2 before the control circuit of FIG. 9 will process the signals to produce the roll and pitch errors. This is because the AND gates 130, 132, 136, and 138 can only be enabled by the presence of the signal EC from the threshold detector 108. In the event that radiation is received by either of the flakes 1 or 2, or both, without flake C, such as in the case of radiation from the sun, the signal EC will not be generated and therefore none of these AND gates will be enabled and no S1 and S2 signals will be applied to the lead-lag networks 182 and 186.

Figure 13:
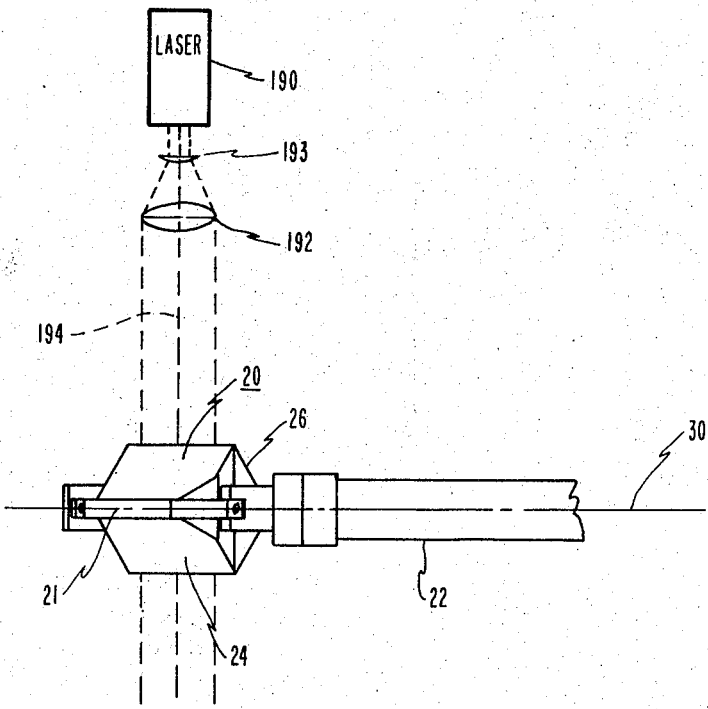
FIG. 13 illustrates a optical schematic diagram of laser beam scanner according to a second embodiment of the invention.

FIG. 13 discloses another embodiment of the invention for directing a beam of radiation along the dual-lobe crossed scanning pattern of FIG. 6. A beam of radiation from a laser source 190 is directed by a telescope including lenses 192 and 193 along an axis 194 to the double dove prism 20. The axis 194 intersects the axis of rotation 30 and is generally normal thereto. As the double dove prism 20 is rotated, the beam of radiation is deflected in a manner so that the beam follows the dual-lobe crossed scanning pattern.

Although the optical scanning system of the invention has been described in the preferred embodiment including a double dove prism arrangement, it is to be understood that the scanning system will also function with a single dove prism. Such an arrangement can be exemplified by deleting the prism 26 from the scanner in FIGS. 1–3, 4A, 4B and 5A and 5B, and by keeping the prism 24 intact. In such a case, as the shaft 22 is rotated, the single prism 24 will provide the dual-lobe crossed scanning pattern illustrated in FIGS. 6 and 8. The ray diagrams of FIGS. 4A, 4B, 5A and 5B will also apply to the single prism arrangement. The advantage of the double dove prism arrangement is that full aperature is provided for the linear portion of the scanning pattern providing maximum sensitivity. On the other hand, the use of the single prism arrangement will provide essentially the same scanning pattern, but at a reduced sensitivity.

A further modification is the use of a thin double sided reflecting mirror, instead of the prisms 24 and 26. By double sided reflecting mirror we mean a mirror that has a silvered reflective surface on both sides. Under this arrangement, the shaft 20 will be suitably connected to the ends of the mirror so that the axis of rotation 30 intersects the plane of the mirror at transverse angle, in a manner as illustrated by the planar surface 28 of FIG. 3. In this case, the outline of the prisms 24 and 26 of FIG. 3 can be ignored and the double sides mirror is represented by the planar surface 28. Under such an arrangement, as the shaft 20 is rotated, the mirror will provide the same wobbling movement, relative to the axis of rotation 30, as the planar surface 28. The detector 34 will again be mounted relative to the axis of rotation 30 and the mirror, as it is with the double dove prism reflecting surface 28, to receive radiation reflected from the mirror surfaces. For an angle of rotation of the shaft 22 of 180 degrees one side of the mirror will face the detector 34, while for the other 180 degrees of radiation the other side will face the detector. The double side reflecting mirror will provide a similar dual-lobe crossed scanning pattern as illustrated in FIG. 6, however having a discontinuity near the zero degree and 180 degree etc. points (REF1 and REF3) and at a lower effeciency than with the single or double dove prism arrangement. The discontinuity at high altitude orbits will present problems, however for low altitude orbits, the discontinuity will be small relative to the duration of a scan pass across the earth (as it is in the center of the earth) and can be ignored.

The optical scanning system of the invention has the advantage of having only one moving unit thereby reducing lubrication problems and improving the statistical life of the system. In addition, the weight of the scanner is reduced as compared to the systems of the prior art thereby reducing problems associated with placing satellites into orbit. The shape of the lobes in the scanning pattern can be changed by changing the angle A between the axis of rotation 30 and the reflecting surface 28. Only one crossed scan across the earth is required to provide sufficient information for controlling the attitude of the vehicle relative to the earth, and sufficient information to provide altitude information. Since only the portion of the scan pattern near the crossover is used, a cover with an "X" shaped transparent pattern can be provided, thereby minimizing the problems concerned with structural strength.

I claim:

1. An optical scanning system comprising:
    detection means responsive to radiation for producing an electrical signal;
    optical means for imaging radiation on said detection means, and
    scanning means having a dual-lobe crossed scanning pattern for transmitting the radiation received via the scanning pattern to said optical means.

2. An optical scanning system comprising:
    detection means responsive to radiation for producing an electrical signal;
    at least one prism; and
    means for rotating said prism relative to said detecting means so that said prism produces a dual-lobe crossing type of scanning pattern and transmits radiation to said detection means received with said scanning pattern.

3. An optical scanner system as defined in claim 2 including:
    two prisms mounted to form a double dove prism.

4. An optical scanning system comprising:
    a source of radiation, and
    scanning means for receiving radiation from said source and transmitting the radiation in a dual-lobe crossed scanning pattern.

5. An optical scanning system as defined in claim 4 wherein said scanning means includes:
    at least one prism, and
    means for rotating said prism relative to said source so that said prism projects the radiation along said dual-lobe crossed scanning pattern.

6. An optical scanning system as defined in claim 4 wherein said scanning means includes:
    a double dove prism, and
    means for rotating said prism relative to said source so that said double dove prism projects the radiation along the dual-lobe crossed scanning pattern.

7. A horizon sensor for controlling the attitude of a space vehicle relative to a space object comprising:
    detection means responsive to radiation for producing an electrical signal;
    scanning means having a dual-lobe crossed scanning pattern for scanning the object and transmitting radiation received from object scanned via at least a portion of the scanning pattern to said detection means;
    signal generating means coupled to said scanning means for providing electrical signals for identifying the portions of the scanning pattern being traversed, and
    circuit means responsive to the electrical signals from the detection means and said signal generation means for providing control signals for orienting the attitude of the vehicle relative to the object.

8. A horizon sensor as defined in claim 7 wherein said scanning means includes:
    at least one prism, and
    means for rotating said prism relative to said detection means so that said prism produces the dual-lobe crossed pattern.

9. A horizon sensor as defined in claim 7 wherein said scanning means includes:
    a double dove prism, and
    means for rotating said double dove prism relative to said detection means so that said double dove prism produces the dual-lobe crossed scanning pattern.

10. A photoelectric scanning system comprising:
    first optical means including a planar surface having two radiation reflective sides;
    means for mounting said first optical means for rotation about an axis that is transverse to said planar surface at an angle other than normal so that said first optical means, when rotated, produces a crossed scanning pattern;
    radiation sensitive detection means, and
    second optical means mounted to alternately receive radiation from opposite reflective sides of said first optical means as said first optical means is rotated for directing the radiation so received to said detection means.

11. A photoelectric scanning system as defined in claim 10 wherein:
    said first optical means includes at least one prism.

12. A photoelectric scanning system as defined in claim 10 wherein:
    said first optical means includes two prisms having a surface of each abutting to form the planar surface.

13. A photoelectric scanning system as defined in claim 10 wherein:
the optical axis of said second optical means lies at an angle substantially normal to the axis of rotation.

14. A photoelectric scanning system as defined in claim 13 wherein:
said planar surface forms an angle between 30° to 60° with the rotational axis.

15. A photoelectric scanning system as defined in claim 10 wherein:
said detection means includes three radiation sensitive surfaces for providing electrical signals in response to radiation applied thereto.

16. An optical scanning system comprising:
optical means providing a planar surface having tow radiation reflective sides;
means for mounting said optical means for rotation about an axis that is transverse the planar surface at an angle other than normal so that said optical means, when rotated about said axis, produces a corssed scanning pattern;
means for rotating said optical means about said axis, and
means for directing a beam of radiation toward said optical means along a direction lying in a plane that is transverse said axis of rotation to alternately impinge on opposite reflective sides of said planar surface when said optical means is rotated.

17. An optical scanning system as defined in claim 16 wherein:
said optical means includes at least one prism.

18. An optical scanning system as defined in claim 16 wherein:
said optical means includes two prisms having a surface of each abutting to form the planar surface.

19. An optical scanning system as defined in claim 16 wherein:
said beam of radiation is directed along a plane that is normal to said axis of rotation.

20. A horizon sensing system for space vehicles adapted for controlling the attitude thereof relative to space objects comprising:
radiation sensitive means for producing electrical signals in response to radiation applied thereto; optical scanning means having a dual-lobe crossed scanning pattern for directing radiation received from said scanning pattern as said object is scanned to said radiation sensitive means, and
control circuit means receiving said electrical signals from said radiation sensitive means for generating control signals that are a function of the attitude of said optical means relative to said object.

21. A horizon sensor for providing signals for controlling the attitude of a vehicle relative to a space object comprising:
radiation sensitive means for generating an electrical signal in response to radiation applied thereto;
a double dove prism;
mounting means for mounting said double dove prism with one surface of each of the prisms abutting, and for rotation about an axis extending at an angle transverse said abutting surfaces so that said double dove prism when rotated provides a dual-lobe crossed scanning pattern;
optical means positioned to receive radiation from the double dove prism and directing the radiation so received to said radiation sensitive means, and
control means connected to receive electrical signals from said radiation sensitive means for providing signals corresponding to the pitch and roll attitude of the vehicle relative to the space object.

22. A horizon sensor as defined in claim 21 wherein:
said planet is the earth;
said radiation sensitive means includes a three flake infrared bolometer, and
the arrangement being such that the three flake bolometer, said prism and said optical means provides a means for sun radiation rejection.

23. A horizon sensor as defined in claim 21 wherein said control circuit means includes:
detection means for detecting the rotational position of the double dove prism, and
circuit means synchronized by said detection means for converting the signals from the radiation sensitive means into signals providing an indication of the magnitude and direction of any pitch and roll error.

24. A horizon sensor as defined in claim 23 wherein:
said circuit means provides signal pulses having a duration and a polarity that is a function of the pitch and roll errors.

25. An optical scanning system comprising:
radiation detection means;
optical means including a surface that is radiation reflecting on opposite sides thereof; and
means for rotating said optical means so that said optical means produces a crossed scanning pattern having a single crossover for each complete rotation thereof and directs radiation received via said scanning pattern onto said radiation detection means.

26. An optical scanning system as defined in claim 25 wherein:
said optical means includes at least one prism.

27. An optical scanning system as defined in claim 25 wherein:
said optical means include two prisms having a surface of each abutting to define said planar surface.

28. An optical scanning system as defined in claim 25 wherein:
said optical means includes a double dove prism.

* * * * *